United States Patent
Martin et al.

(10) Patent No.: US 9,432,299 B2
(45) Date of Patent: Aug. 30, 2016

(54) SYSTEM AND METHOD FOR ORDERING OF DATA TRANSFERRED OVER MULTIPLE CHANNELS

(71) Applicant: Silicon Graphics International Corp., Milpitas, CA (US)

(72) Inventors: Randal G. Martin, San Jose, CA (US); Steven C. Miller, Livermore, CA (US); Mark D. Stadler, Sunnyvale, CA (US); David A. Kruckemyer, Mountain View, CA (US)

(73) Assignee: Silicon Graphics International Corp., Milpitas, CA (US)

( * ) Notice: Subject to any disclaimer, the term of this patent is extended or adjusted under 35 U.S.C. 154(b) by 0 days.

(21) Appl. No.: 14/635,708

(22) Filed: Mar. 2, 2015

(65) Prior Publication Data

US 2015/0188832 A1  Jul. 2, 2015

Related U.S. Application Data

(63) Continuation of application No. 12/273,453, filed on Nov. 18, 2008, now Pat. No. 8,971,329, which is a continuation of application No. 09/910,587, filed on Jul. 20, 2001, now Pat. No. 7,453,878.

(60) Provisional application No. 60/219,915, filed on Jul. 21, 2000.

(51) Int. Cl.
*H04L 12/801* (2013.01)
*H04L 12/825* (2013.01)
*H04L 12/707* (2013.01)

(52) U.S. Cl.
CPC ............... *H04L 47/34* (2013.01); *H04L 45/24* (2013.01); *H04L 47/10* (2013.01); *H04L 47/266* (2013.01); *H04L 47/39* (2013.01)

(58) Field of Classification Search
None
See application file for complete search history.

(56) References Cited

U.S. PATENT DOCUMENTS

| | | | |
|---|---|---|---|
| 4,703,475 A | 10/1987 | Dretzka et al. | |
| 5,222,061 A | 6/1993 | Doshi et al. | |
| 5,754,754 A | 5/1998 | Dudley et al. | |
| 5,825,748 A | 10/1998 | Barkey et al. | |
| 6,044,406 A * | 3/2000 | Barkey .............. | H04Q 11/0478 370/231 |
| 6,072,797 A | 6/2000 | Fletcher | |
| 6,154,794 A | 11/2000 | Abdalla et al. | |
| 6,243,358 B1 | 6/2001 | Monin | |
| 6,246,684 B1 | 6/2001 | Chapman et al. | |
| 6,366,989 B1 | 4/2002 | Keskar et al. | |

(Continued)

OTHER PUBLICATIONS

U.S. Appl. No. 09/910,587 Final Office Action mailed Oct. 9, 2007.

(Continued)

*Primary Examiner* — Feben M Haile
(74) *Attorney, Agent, or Firm* — Polsinelli LLP

(57) ABSTRACT

A multiple channel data transfer system (10) includes a source (12) that generates data packets with sequence numbers for transfer over multiple request channels (14). Data packets are transferred over the multiple request channels (14) through a network (16) to a destination (18). The destination (18) re-orders the data packets received over the multiple request channels (14) into a proper sequence in response to the sequence numbers to facilitate data processing. The destination (18) provides appropriate reply packets to the source (12) over multiple response channels (20) to control the flow of data packets from the source (12).

18 Claims, 2 Drawing Sheets

(56) References Cited

U.S. PATENT DOCUMENTS

| | | | |
|---|---|---|---|
| 6,452,901 B1 * | 9/2002 | Yang | H04Q 11/0478 370/231 |
| 6,594,701 B1 | 7/2003 | Forin | |
| 6,788,686 B1 | 9/2004 | Khorimaky et al. | |
| 6,810,428 B1 | 10/2004 | Larsen et al. | |
| 6,944,173 B1 | 9/2005 | Jones et al. | |
| 7,061,929 B1 | 6/2006 | Eberle et al. | |
| 7,269,666 B1 | 9/2007 | Leitner et al. | |
| 7,453,878 B1 | 11/2008 | Martin | |
| 8,971,329 B1 | 3/2015 | Martin | |
| 2004/0049612 A1 | 3/2004 | Boyd et al. | |

OTHER PUBLICATIONS

U.S. Appl. No. 09/910,587 Office Action mailed Apr. 20, 2007.
U.S. Appl. No. 09/910,587 Office Action mailed Oct. 10, 2006.
U.S. Appl. No. 09/910,587 Final Office Action mailed Jun. 21, 2006.
U.S. Appl. No. 09/910,587 Office Action mailed Jan. 12, 2006.
U.S. Appl. No. 09/910,587 Final Office Action mailed Jul. 18, 2005.
U.S. Appl. No. 09/910,587 Office Action mailed Feb. 9, 2005.
U.S. Appl. No. 12/273,453 Final Office Action mailed Mar. 27, 2014.
U.S. Appl. No. 12/273,453 Office Action mailed Sep. 6, 2013.
U.S. Appl. No. 12/273,453 Final Office Action mailed Mar. 1, 2013.
U.S. Appl. No. 12/273,453 Office Action mailed Jul. 10, 2012.
U.S. Appl. No. 12/273,453 Final Office Action mailed Aug. 18, 2011.
U.S. Appl. No. 12/273,453 Office Action mailed Mar. 2, 2011.
U.S. Appl. No. 12/273,453 Final Office Action mailed Sep. 3, 2010.
U.S. Appl. No. 12/273,453 Office Action mailed Feb. 23, 2010.

* cited by examiner

SYSTEM AND METHOD FOR ORDERING OF DATA TRANSFERRED OVER MULTIPLE CHANNELS

CROSS-REFERENCE TO RELATED APPLICATIONS

The present application is a continuation and claims the priority benefit of U.S. patent application Ser. No. 12/273,453 filed Nov. 18, 2008, which is a continuation and claims the priority benefit of U.S. patent application Ser. No. 09/910,587 filed Jul. 20, 2001, now U.S. Pat. No. 7,453,878, which claims the priority benefit of provisional application 60/219,915 filed Jul. 21, 2000, the disclosures of which are incorporated herein by reference.

BACKGROUND

1. Field of the Invention

The present invention relates in general to computer information processing and more particularly to a system and method for ordering data transferred over multiple channels.

2. Description of the Related Art

Conventional data transfer schemes may provide flow control for a single channel. However, these schemes do not address the issue of splitting a transfer over multiple physical or virtual channels. In environments where the ordering of the data is important, splitting the data transfer over multiple channels may cause the data to sent in an order different from originally desired. For example, graphics systems may require the 10 processing of data in a certain order to effectively generate an image for display that reflects the intended scene to be viewed. The destination will not be able to effectively process the data since it is received in a different order than when it was generated. Therefore, 15 it is desirable to have a capability to re-order the data at the destination despite the use of multiple channels for data transfer.

SUMMARY OF THE PRESENTLY CLAIMED INVENTION

From the foregoing 1 it may be appreciated by those skilled in the art that a need has arisen for a technique that can re-order data at a destination after the data has been transferred over multiple channels while providing flow control for the data transfer. In accordance with the present invention, a system and method for ordering data transferred over multiple channels are provided that substantially eliminate or 10 greatly reduce disadvantages and problems associated with conventional data transfer techniques.

According to an embodiment of the present invention there is provided a method for ordering data transferred over multiple channels that includes generating a data packet in response to a flow control credit. A sequence number is generated and inserted into the data packet. One of a plurality of channels to transfer the data packet is selected and the data packet is transferred over the selected one of the plurality of channels.

The present invention provides various technical advantages over conventional data transfer techniques. For example, one technical advantage is to associate a sequence number to data packets so that they can be placed into the proper sequence at the destination. Another technical advantage is to place data packets received from a source in an appropriate sequence despite transferring the data packets over multiple channels. Yet another technical advantage is to integrate reordering of data packets with flow control of the data packet transfer. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction 5 with the accompanying drawings, wherein like reference numerals represent like parts, in which.

DETAILED DESCRIPTION

Figure 1:
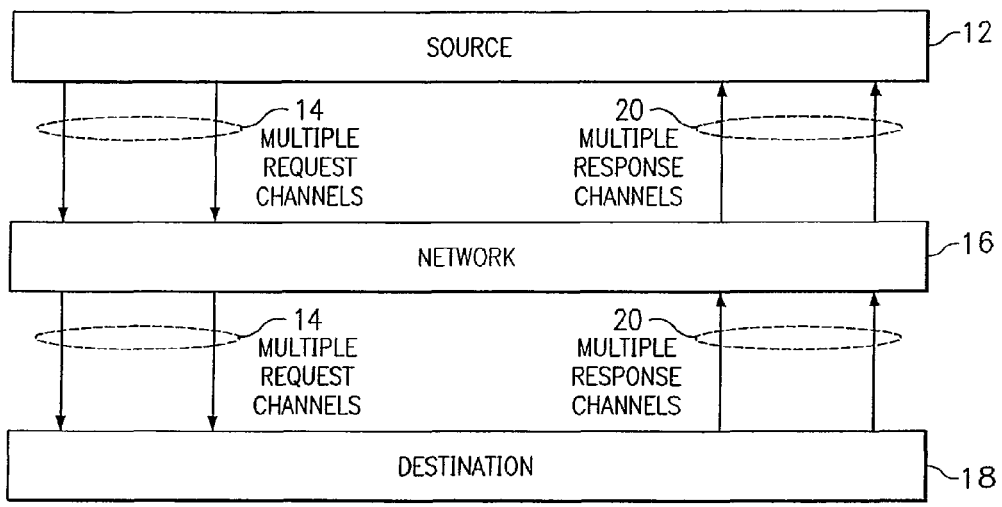
FIG. 1 illustrates a block diagram of a multiple channel data transfer system.

FIG. 1 is a block diagram of a multiple channel data transfer system 10. System 10 includes a source 12 that generates data packets for transfer over multiple request channels 14. Data packets are transferred over multiple request channels 14 through a network 16 to a destination 18. Destination 18 processes the data packets received over multiple request channels 14 and provides appropriate response packets to source 12 over multiple response channels 20 through network 16. In an exemplary scenario, system 10 may be a graphics system wherein source 12 is a node with one or more processors generating data packets and destination 18 is a graphics processor that generates images in response to the data packets. Multiple request channels 14 are needed as the amount of data generated by a processor of the node may exceed the bandwidth of a single channel. Network 16 may be any data transfer medium that may include one or more of a local area network, wide area network, Ethernet network, Internet, or any conventional network for transferring data.

Each data packet generated at source 12 may be placed onto any available one of the multiple request channels 14. For each data packet, source 12 determines an available channel according to capacity and flow control instructions. Examples of flow control implementations in single channel systems can be found in co-pending U.S. application Ser. No. 09/409,805 and U.S. Pat. No. 6,154,794, which are each hereby incorporated by reference herein. In a multi-channel implementation, a first packet may be sent on a first channel and a second packet may be sent on another channel. Because data packets may be sent on different channels, destination 18 may receive and buffer the second packet before the first packet even though the first packet was generated prior to generation of the second packet. Since the processing of data packets in the correct order is important, destination 18 needs to recognize that the first packet is to be processed before the second packet.

Figure 2:
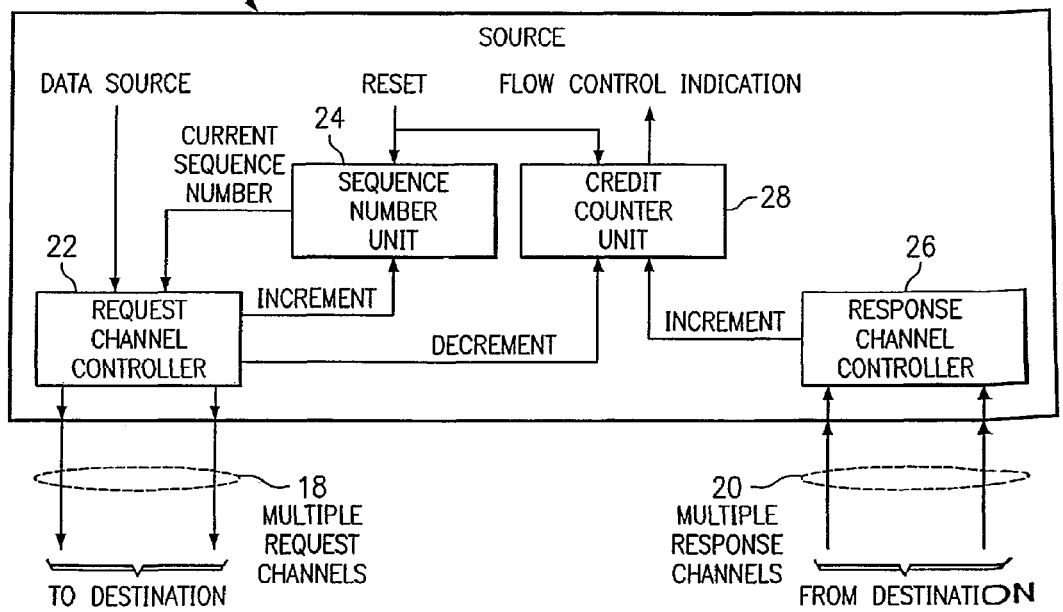
FIG. 2 illustrates a block diagram of a source for lO data packet generation in the multiple channel data transfer system.

FIG. 2 shows a block diagram for the generation of data packets at source 12. Source 12 includes a source request channel controller 22 1 a sequence number unit 24, a response channel controller 26, and a credit counter unit 28. Source request channel controller 22 generates data packets from data received from a data source, such as a processor, in source 12 and selects among multiple request channels for the transferring of the data packets. Alternatively, the data source may provide the data in packet form for transfer by source request channel controller 22.

Source request channel controller 22 inserts a sequence number as provided by sequence number unit 24 for each generated data packet. The sequence number is used by destination 18 in order to re-order the received data packets into the proper sequence. sequence number into a data packet, Upon inserting a source request channel controller 22 transfers the data packet onto a selected one of multiple request channels 14. Source request channel controller 22 issues an increment command to sequence number unit 24 so that the current sequence number provided by sequence number unit 24 to source request channel controller 22 is advanced to the next number in the sequence. The sequence number may be reset by the data source for each block of data to be transferred.

Source request channel controller 22 also issues a decrement command to credit counter unit 28 to indicate that a credit was used in transferring the data packet over the selected one of the multiple request channels 14. Credit counter unit 28 is initialized with a number of credits by a reset signal from the data source. The number of credits is decremented after transfer of each data packet from source request channel controller 22. Credit counter unit 28 provides a flow control indication to the data source to control the amount of data provided by the data source. As long as the number of credits is above a desired threshold value, the flow control indication informs the data source that it may continue to provide data. If the number of credits falls below the desired threshold value, the flow control indication informs the data source to cease providing data until the desired threshold value is again exceeded. The data source may force an interrupt to do a context switch in order that other tasks may be performed in the event that the flow control indication maintains the data cessation status for a certain period of time. The data source will then return to the transfer of data packets. The 25 number of credits is incremented in response to response channel controller 26 receiving a reply from destination 18 over one of multiple response channels 20. The reply includes a credit indicating that destination 18 has processed a data packet and has capability to receive 30 another data packet.

Figure 3:
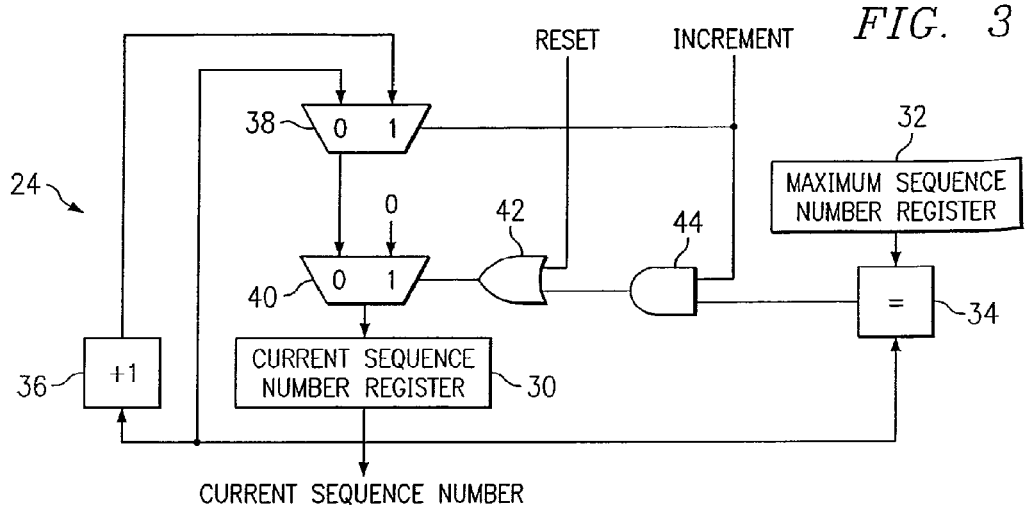
FIG. 3 illustrates a block diagram of a sequence number unit in the source.

FIG. 3 shows a block diagram of sequence number unit 24. Sequence number unit 24 includes a current sequence number register 30, a maximum sequence number register 32, comparator 34, increment unit 36, increment selectors 38 and 40, reset logic 42, and increment logic 44. Upon initialization, a reset signal from the data source causes a sequence number value of zero to be loaded into current sequence number register 30. Increment selector 38 receives the value in current sequence number register 30 and an incremented sequence number value from increment unit 36. Increment counter 38 provides the value from current sequence number register 30 to increment selector 40 unless an increment signal has been received from source request channel controller 22 indicating that a data packet with the value in current sequence number register 30 has been transferred. Increment selector 40 provides the value in current sequence number register 30 back thereto unless a reset signal is received from the data source or an increment signal is received from source request channel controller 22. The reset signal causes the zero value to be loaded into current sequence number register 30. The increment signal causes an incremented value to flow through increment selectors 38 and 40 for loading into current sequence number register 30.

Current sequence number register 30 may also be loaded with the zero value according to a maximum value in maximum sequence number register 32. The value in current sequence number register 30 is compared to the value in maximum sequence number register 32 at comparator 34. If these values are equal, comparator 34, 30 through increment logic 44 and reset logic 42, causes the zero value at increment selector 40 to be loaded into current sequence number register 30. In this manner, a large data packet group may be accommodated without loss of packet ordering since sequence numbers will be freed up and available for re-use once a data packet has been processed. Current sequence number register 30 and maximum sequence number register 32 may be programmable to provide a range of sequence numbers to simplify buffering at destination 18. Also, the programmable nature of these registers allows for varying the size of buffers receiving data packets at destination 18.

Figure 4:
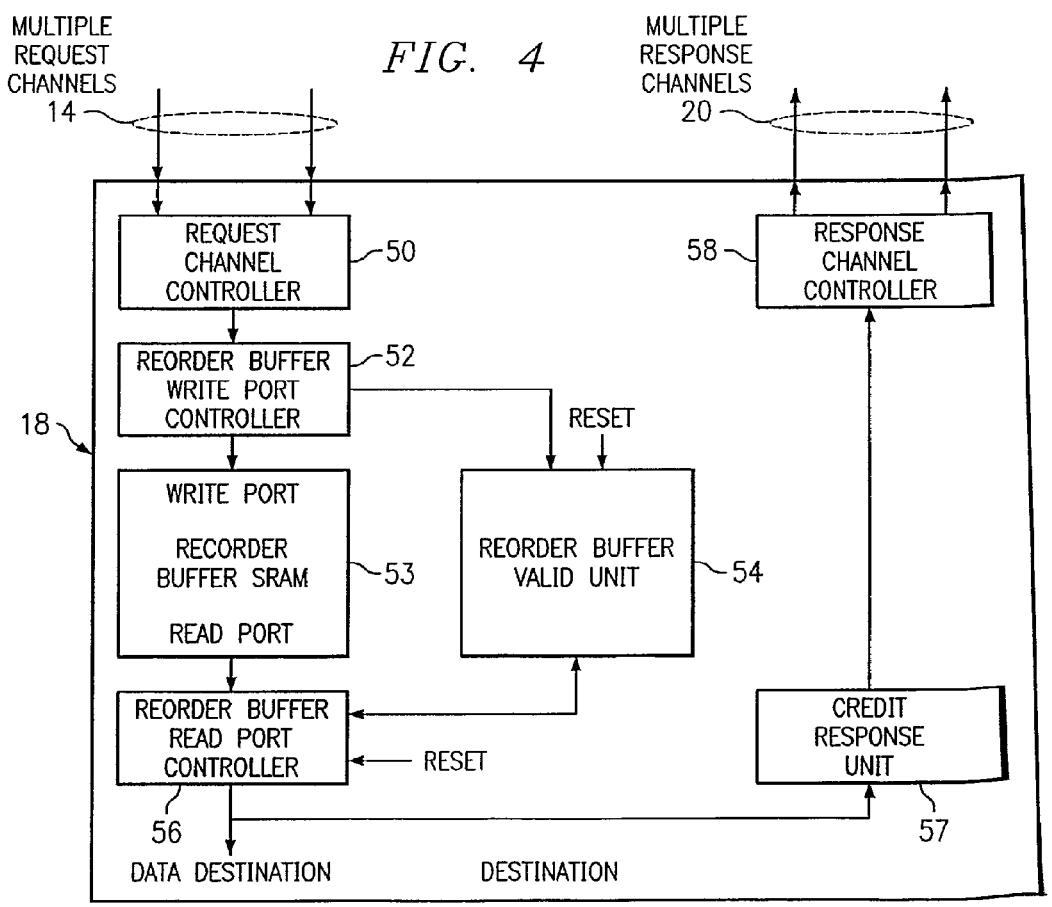
FIG. 4 illustrates a block diagram of a 15 destination for processing data packets in the multiple channel data transfer system.

FIG. 4 shows the processing performed at destination 18. Destination 18 includes a destination request channel controller 50, a re-order buffer write port controller 52, a re-order buffer 53, a re-order buffer valid bit unit 54, a re-order buffer read port controller 56, a credit response unit 57, and a destination response channel controller 58. In operation, destination request channel controller 50 receives data packets from source 12 over multiple request channels 14. Destination request channel 20 controller 50 provides the data packets to a re-order buffer write port controller 52. Ordering of data packets is not guaranteed over multiple request channels 14. To regain the proper ordering of the data packets, re-order buffer write port controller 52 uses the sequence numbers in the data packets to directly index into re-order buffer 53 through its write port. Re-order buffer valid bit unit 54 maintains a valid bit for each portion of re-order buffer 53. When re-order buffer write port controller 52 causes data packets to be stored 30 in re-order buffer 53, a corresponding valid bit is set. Re-order buffer read port controller 56 monitors the valid bits. When a next sequential valid bit is set, the data packets associated with the immediately preceding valid bit in the corresponding portion of re-order buffer 53 are read from its read port and provided to a data destination. Once the data packets have been read from re-order buffer 53, the corresponding valid bit is cleared. All valid bits may be cleared in response to a reset signal. Through use of the sequence numbers, data packets are read from re-order buffer 53 in their original order of generation. As packets are read from re-order buffer 53, credit response unit 57 returns flow control credits back to source 12 through destination response channel controller 58 over multiple response channels 20.

Thus, it is apparent that there has been provided, in accordance with the present invention, a system and method for ordering data transferred over multiple channels that satisfies the advantages set forth above. Although the present invention has been described in detail, it should be understood that various changes, substitutions, and alterations may be made herein. For example, the functionality for providing sequence numbers and flow control credits may be performed in any number of ways other than the implementation described above for appropriate sequence number and credit processing. Other examples may be readily ascertainable by those skilled in the art and may be made herein without departing from the spirit and scope of the present invention as defined by the following claims.

What is claimed is:

1. A method for transferring data packets, the method comprising a packet source:
   receiving packet data from a data source;
   initializing a credit counter with a number of credits by a reset signal from the data source;
   transmitting a first packet of a plurality of packets over a first network request interface of a plurality of network request interfaces at the packet source according to capacity and flow control instructions, wherein the credit counter is adjusted in a first direction after the first packet of the plurality of packets is transmitted over the first network interface of the plurality of network request interfaces;
   transmitting a second packet of the plurality of packets over a second network request interface of the plurality of network request interfaces at the packet source according to the capacity and flow control instructions, wherein the credit counter is adjusted in the first direction after the second packet of the plurality of packets is transmitted over the second network interface of the plurality of network request interfaces, wherein the plurality of packets are received and re-ordered at a destination after at least the first and the second packet are received at the destination;
   sending an indication to the data source, the indication identifying that the credit counter has crossed below a threshold value, wherein the indication causes the data source to stop sending the packet data;
   receiving one or more responses from the destination over a plurality of network response interfaces at the packet source including credits indicating that the destination has processed data packets and has capability to receive more data packets, each response of the one or more responses corresponding to a specific packet of the one or more packets transmitted over the plurality of network request interfaces, wherein the credit counter is adjusted in a second direction after receiving a response of the one or more responses over the plurality of network response interfaces; and
   sending an indication to the data source, the indication identifying that the credit counter has crossed above the threshold value, wherein the indication causes the data source to send additional packet data.

2. The method of claim 1, further comprising:
   receiving an interrupt at the packet source from the data source after the data source has stopped sending the packet data; and
   receiving additional packet data from the data source;
   initializing the credit counter;
   transmitting one or more additional packets over one or more network request interfaces at the packet source, wherein the credit counter is adjusted in the first direction after each of the one or more additional packets are transmitted over the plurality of network request interfaces; and
   receiving one or more additional responses over the one or more network response interfaces at the packet source, wherein the credit counter is adjusted in the second direction after receiving a response of the one or more additional responses, each response of the one or more additional responses corresponding to a specific packet of the one or more additional packets transmitted.

3. The method of claim 1, further comprising: that the receiving the additional packet data from the data source; and transmitting one or more additional packets over the at least one of the plurality of network request interfaces at the packet source, wherein the credit counter is adjusted in the first direction after each of the one or more additional packets are transmitted over the plurality of network request interfaces.

4. The method of claim 1, wherein the first direction corresponds to decrementing the credit counter and the second direction corresponds to incrementing the credit counter.

5. The method of claim 1, wherein the first direction corresponds to incrementing the credit counter and the second direction corresponds to decrementing the credit counter.

6. The method of claim 1, wherein crossing the threshold value is detected by comparing the credit counter to a maximum sequence number.

7. A non-transitory computer readable medium having embodied thereon a program executed by a process to perform a method for transferring data packets, the method comprising a packet source:
   receiving packet data from a data source;
   initializing a credit counter with a number of credits by a reset signal from the data source;
   transmitting a first packet of a plurality of packets over a first network request interface of a plurality of network request interfaces at the packet source according to capacity and flow control instructions, wherein the credit counter is adjusted in a first direction after the first packet of the plurality of packets is transmitted over the first network interface of the plurality of network request interfaces;
   transmitting a second packet of the plurality of packets over a second network request interface of the plurality of network request interfaces at the packet source according to the capacity and flow control instructions, wherein the credit counter is adjusted in the first direction after the second packet of the plurality of packets is transmitted over the second network interface of the plurality of network request interfaces, wherein the plurality of packets are received and re-ordered at a destination after at least the first and the second packet are received at the destination;
   sending an indication to the data source, the indication identifying that the credit counter has crossed below a threshold value, wherein the indication causes the data source to stop sending the packet data;
   receiving one or more responses from the destination over a plurality of network response interfaces at the packet source including credits indicating that the destination has processed data packets and has capability to receive more data packets, each response of the one or more responses corresponding to a specific packet of the one or more packets transmitted over the plurality of network request interfaces, wherein the credit counter is adjusted in a second direction after receiving a response of the one or more responses over the plurality of network response interfaces; and
   sending an indication to the data source, the indication identifying that the credit counter has crossed above the threshold value, wherein the indication causes the data source to send additional packet data.

8. The non-transitory computer readable storage medium of claim 7, the program being further executable to:
   receive an interrupt at the packet source from the data source after the data source has stopped sending the packet data;
   receive additional packet data from the data source;

initialize the credit counter;

transmit one or more additional packets over the plurality of network request interfaces at the packet source, wherein the credit counter is adjusted in the first direction after each of the one or more additional packets are transmitted over the one or more network request interfaces; and receive one or more additional responses over the one or more network response interfaces at the packet source, wherein the credit counter is adjusted in the second direction after receiving a response of the one or more additional responses, each response of the one or more responses corresponding to a specific packet of the one or more additional packets transmitted.

9. The non-transitory computer readable storage medium of claim 7, the program further executable to: receive the additional packet data from the data source; and transmit one or more additional packets over the at least one of the plurality of network request interfaces at the packet source, wherein the credit counter is adjusted in the first direction after each of the one or more additional packets are transmitted over the plurality of network request interfaces.

10. The non-transitory computer readable storage medium of claim 7, wherein the first direction corresponds to decrementing the credit counter and the second direction corresponds to incrementing the credit counter.

11. The method of claim 7, wherein the first direction corresponds to incrementing the credit counter and the second direction corresponds to decrementing the credit counter.

12. The method of claim 7, wherein crossing the threshold value is detected by comparing the credit counter to a maximum sequence number.

13. A system for transferring data packets from a packet source, the system comprising:
 a memory;
 a processor; and
 a plurality of network communication interfaces, wherein packet data is received from a data source;
  a credit counter is initialized counter with a number of credits by a reset signal from the data source;
  a first packet of a plurality of packets is transmitted over a first network request interface of the plurality of network request interfaces at the packet source according to capacity and flow control instructions, wherein the credit counter is adjusted in a first direction after the first packet of the plurality of packets is transmitted over the plurality of network request interfaces;
  a second packet of a plurality of packets is transmitted over a second network request interface of the plurality of network request interfaces at the packet source according to the capacity and flow control instructions, wherein the credit counter is adjusted in the first direction after the second packet of the plurality of packets is transmitted over the second network request interface of the plurality of network request interfaces, wherein the plurality of packets are received and re-ordered at a destination after at least the first and the second packet are received at the destination;
  an indication is sent to the data source after determining that the credit counter has crossed below a threshold value wherein the indication causes the data source to stop sending the packet data;
  one or more responses is received from the destination over a plurality of network response interfaces at the packet source including credits indicating that the destination has processed data packets and has capability to receive more data packets, each response of the one or more responses corresponding to a specific packet of the one or more packets transmitted over the plurality of network request interfaces, wherein the credit counter is adjusted in a second direction after receiving a response of the one or more responses over the plurality of network response interfaces; and
  an indication is sent to the data source after determining that the credit counter has crossed above the threshold value, wherein the indication causes the data source to send additional packet data.

14. The system of claim 13, wherein:
an interrupt is received at the packet source from the data source after the data source has stopped sending the packet data;
additional packet data is received from the data source;
the credit counter is initialized;
one or more additional packets are transmitted over the one or more network request interfaces at the packet source, wherein the credit counter is adjusted in the first direction after each of the one or more additional packets are transmitted over the one or more network request interfaces; and
one or more additional responses are received over one or more network response interfaces at the packet source, wherein the credit counter is adjusted in the second direction after receiving a response of the one or more additional responses, each response of the one or more additional responses corresponding to a specific packet of the one or more packets transmitted.

15. The system of claim 13, the wherein the packet source: receives the additional packet data from the data source; and transmits one or more additional packets over the at least one of the plurality of network request interfaces at the packet source, wherein the credit counter is adjusted in the first direction after each of the one or more additional packets are transmitted over the plurality of network request interfaces.

16. The system of claim 13, wherein the first direction corresponds to decrementing the credit counter and the second direction corresponds to incrementing the credit counter.

17. The system of claim 13, wherein the first direction corresponds to incrementing the credit counter and the second direction corresponds to decrementing the credit counter.

18. The system of claim 13, wherein crossing the threshold value is detected by comparing the credit counter to a maximum sequence number.

* * * * *